United States Patent [19]

Hallock

[11] Patent Number: 4,699,821

[45] Date of Patent: Oct. 13, 1987

[54] HEAT-RECOVERABLE SHEET FOR USE AS PROTECTIVE CLOSURE

[75] Inventor: William A. Hallock, Hastings, Minn.

[73] Assignee: Minnesota Mining & Manufacturing Company, St. Paul, Minn.

[21] Appl. No.: 767,167

[22] Filed: Aug. 19, 1985

[51] Int. Cl.⁴ .............................................. B32B 3/06
[52] U.S. Cl. .................................... 428/192; 428/36; 156/85; 156/86
[58] Field of Search .................... 428/36, 192; 156/85, 156/86

[56] References Cited

U.S. PATENT DOCUMENTS

| | | | |
|---|---|---|---|
| 3,770,556 | 11/1973 | Evans et al. | 161/39 |
| 4,018,733 | 4/1977 | Lopez et al. | 260/27 |
| 4,442,153 | 4/1984 | Meltsch | 428/36 |
| 4,448,824 | 5/1984 | Holmes et al. | 428/33 |
| 4,586,971 | 5/1986 | Wallace | 156/85 |

Primary Examiner—J. David Welsh
Attorney, Agent, or Firm—Donald M. Sell; James A. Smith; Gerald F. Chernivec

[57] ABSTRACT

A heat-recoverable sheet is provided having two opposing exterior transverse edges and interior edges transverse to the direction of recovery of the sheet extending from one of said exterior edges. When the heat-recoverable sheet is coated on one face thereof with a hot-melt adhesive and used as a wrap-around protective closure with the interior edges and the hot-melt adhesive enveloped within the closure, the movement of the enclosed exterior edge during recovery is retarded to minimize the formation of any void spaces in the hot-melt adhesive.

18 Claims, 4 Drawing Figures

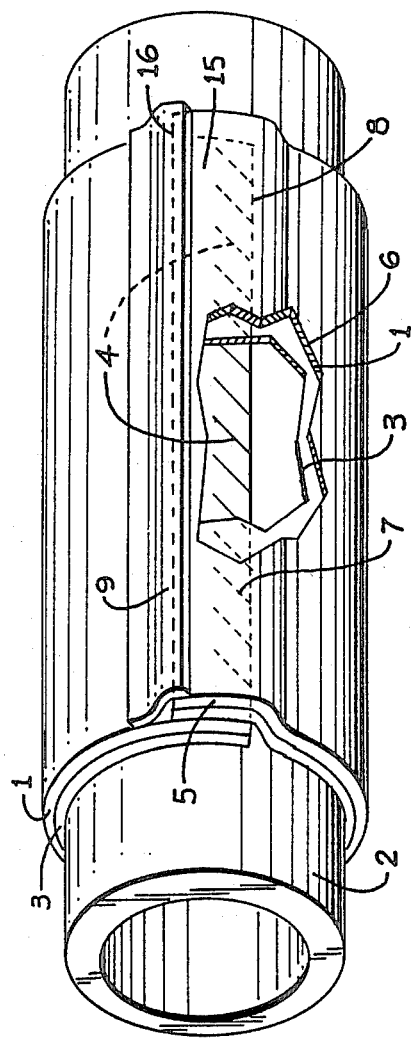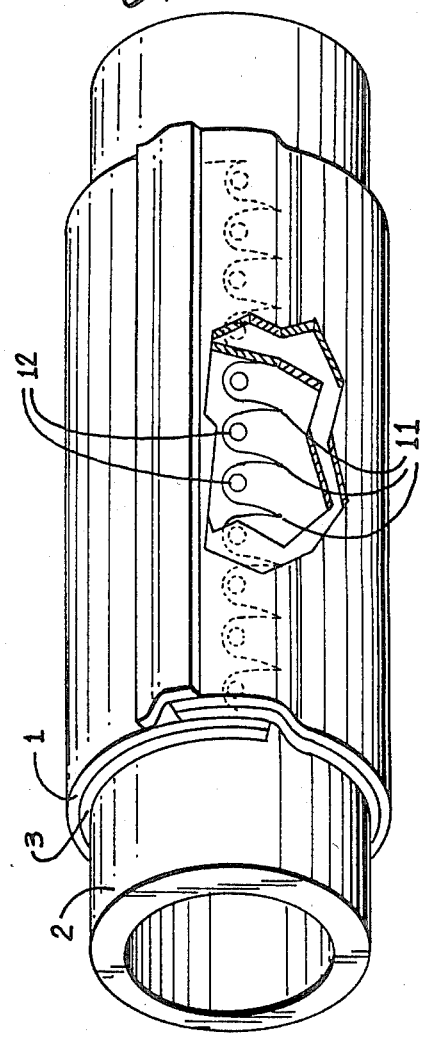

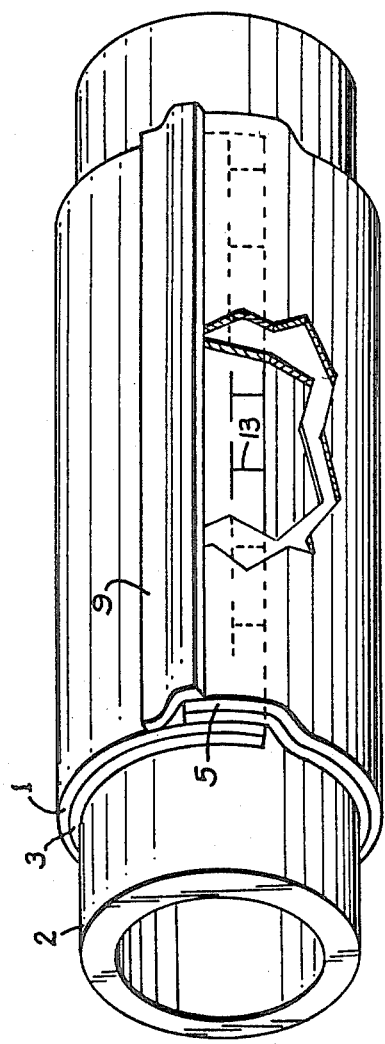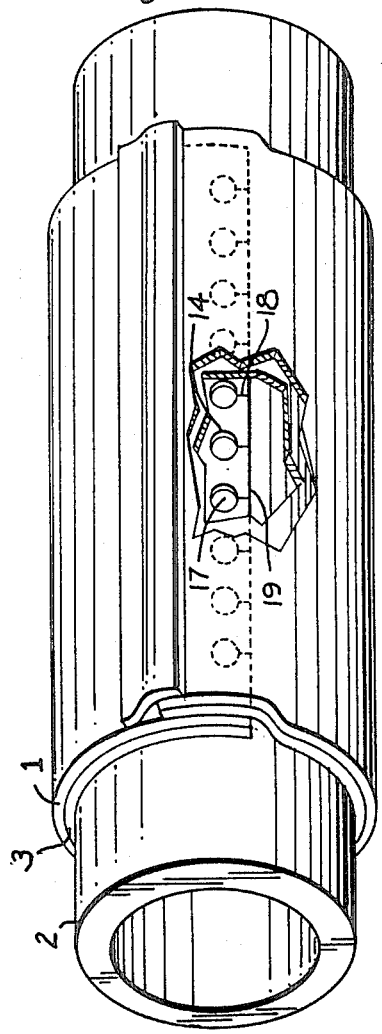

HEAT-RECOVERABLE SHEET FOR USE AS PROTECTIVE CLOSURE

TECHNICAL FIELD OF THE INVENTION

This invention relates to a heat-recoverable sheet useful as a wrap-around protective closure. More particularly, this invention relates to a heat-recoverable sheet wherein one edge thereof is structured to improve the sealing characteristics of the material when used as a wrap-around protective closure.

BACKGROUND OF THE INVENTION

U.S. Pat. No. 3,770,556 to Evans et al. discloses a heat-recoverable sleeve having voids in one transverse edge thereof to prevent buckling of the material of the sleeve that has along the edge been treated to reduce the recoverability thereof and which is exposed on the exterior of a closure formed with the sleeve.

U.S. Pat. No. 4,448,824 to Holmes et al. discloses a dimensionally-recoverable sheet wherein one of the transverse edges is profiled with repeating structural units. The dimensionally-recoverable sheet is wrapped about a substrate in a manner such that the profiled edge underlies an overlapped portion of the same sheet. When the dimensionally recoverable sheet is caused to recover, the profiled edge causes a breakup in a leak path in a hot-melt adhesive applied to the interior side of the overlapping flap of recoverable material. The breakup of the leak path provides more secure closure because a breach in the hot-melt adhesive at either end of the seam will not break the seal all along a discontinuous leak path as it would along a continuous leak path.

While the formation of a discontinuous leak path is advantageous, an overall minimization of the void spaces in the hot-melt adhesive caused by the contraction of the dimensionally recoverable sheet is desirable.

SUMMARY OF THE INVENTION

This invention relates to a heat-recoverable sheet having first and second opposing exterior transverse edges and a plurality of interior edges which extend from the first exterior transverse edge wherein at least a portion of the length of each interior edge is transverse to the direction of recovery of the sheet. In a preferred embodiment, the first transverse edge has a plurality of slits therein wherein at least a portion of the length of each of the slits extends from the first exterior edge towards the second exterior edge in a direction transverse to the direction of recovery of the sheet. This invention also relates to a wrap-around protective closure comprised of a sheet of heat-recoverable material as described above having on one side of the sheet a coating of a hot-melt adhesive.

This invention also relates to a method of enclosing a substrate comprised of wrapping the protective closure described above about the substrate in a manner such that the first edge is enveloped between the substrate and the sheet material. This invention also relates to a method of enclosing a substrate with a sheet of heat-recoverable material as described above having on one side of the sheet material a coating of a hot-melt adhesive comprising wrapping the sheet about a substrate in a manner such that the first edge of the sheet is enveloped between the substrate and the sheet and at least that portion of the sheet which is adjacent to the first edge and which is enveloped within the closure is in contact with the coating of hot-melt adhesive.

The plurality of interior edges allow for the formation of braking edges and fingers when the sheet is wrapped and recovered about a substrate which effectively isolates any voids in the hot-melt adhesive between the fingers.

BRIEF DESCRIPTION OF THE DRAWINGS.

FIG. 1 is a perspective view of a substrate around which has been installed a recoverable sheet of this invention having diagonal slits extending from the appropriate exterior transverse edge thereof;

FIG. 2 is a perspective view of the closure shown in FIG. 1 after the sheet of this invention has been caused to recover;

FIG. 3 is a perspective view of a substrate around which has been installed a recoverable sheet of this invention having T-slits extending from the appropriate exterior transverse edge thereof; and FIG. 4 is a perspective view of a substrate around which has been installed a recoverable sheet of this invention having a plurality of interior edges as a result of circular openings through the sheet and slits extending from each opening to the appropriate exterior transverse edge thereof.

DETAILED DESCRIPTION OF THE INVENTION

The heat-recoverable sheet of this invention has opposing exterior transverse edges, and is preferably rectangular in shape. Transverse edges are edges which extend in a direction transverse to the direction of recovery of the sheet. Exterior edges are those edges which define the general exterior outline, i.e., the periphery, of the sheet. As noted above, the sheet also possesses a plurality of interior edges which extend from one exterior transverse edge such that at least a portion of each interior edge is transverse to the direction of recovery of the sheet. As used herein, the term "interior edge" shall mean an edge of the sheet which opposes at least a portion of the exterior transverse edge from which it extends. By "opposes", it is meant that an expanse of sheet exists between such edges such that the edges are opposing minor faces of the expanse of sheet. This expanse of the sheet is, preferably, otherwise identical to the remainder of the sheet, i.e., it has substantially the same recovery ratio, when allowed to recover without significant tension, as the remainder of the sheet. As used herein, the "transverse length" of an edge is the distance the edge extends in a direction perpendicular to the direction of recovery of the sheet. For example, a straight edge which extends 1.414 inches at an angle of 45° to the direction of recovery will have a transverse length of about 1 inch. Conversely, the "recovery length" of an edge is the distance the edge extends in a direction parallel to the direction of recovery of the sheet.

In the preferred embodiments, the interior edges are the result of simple slits in the exterior transverse edge extending toward the other exterior transverse edge in a direction transverse to the direction of recovery of the sheet. As used herein, the term "slit" shall refer to a void extending from an exterior transverse edge. Generally, such slits will be less than about ⅛ inch in width. Preferably, such slits are no wider than the thickness of the unrecovered sheet. Most preferably, such slits are no greater in width than the gap resulting from a simple incision into the sheet, i.e., without excision of any material from the sheet. These slits may take many forms, so long as at least a portion of the length of each slit is transverse to the direction of recovery of the sheet.

As noted above, the preferred embodiments of this invention are sheets with simple slits extending from one exterior edge. In certain embodiments of this invention, the entire length of each of substantially all slits is transverse to the direction of recovery of the sheet. These slits will be referred to hereinafter as diagonal-slits. These slits are illustrated in FIG. 1, discussed hereinafter. In a preferred example of these embodiments, each slit preferably defines a substantially straight line which forms an angle of preferably from about 15° to about 45° with the exterior line of the transverse edge in which the slits have been made.

In other embodiments, a portion of each slit is parallel to the exterior line of the first exterior edge and a portion is not. In a preferred example of these embodiments, a portion of the slit is perpendicular to the opposing transverse edges, and this portion extends from the first exterior edge to the midpoint of a slit which extends laterally from the perpendicular slit and is parallel to the first edge. These slits will be referred to hereinafter as T-slits. These slits are illustrated in FIG. 3, discussed hereinafter.

In other embodiments, the interior edges are the result of a plurality of openings through the sheet wherein a slit extends from each opening to the first exterior transverse edge. These slits are illustrated in FIG. 4, discussed hereinafter. The width of each opening in a direction perpendicular to the direction of recovery of the sheet is preferably greater than about four (4) times the thickness of the unrecovered sheet. These openings can take many forms, e.g., circles, triangles, squares, rectangles, etc., so long as they result in an interior transverse edge as described herein in the sheet.

Without desiring to be bound by any particular theory, it is believed that an interior transverse edge allows for the formation of a braking edge during the recovery of the sheet when wrapped about a substrate as described hereinafter, which serves to reduce the distance through which the enveloped edge will recover. It is believed that this braking phenomena occurs as a result of friction which results from the buckling of the interior transverse edges against the overlapping flap of the sheet of heat-recoverable material.

Furthermore, the portions of the sheet between the interior transverse edge and the exterior transverse edge form elongated projections, i.e., fingers, when the sheet is wrapped with the first exterior edge and the plurality of interior edges enclosed and caused to recover about a substrate. It has been found that any void space in the hot-melt adhesive occurs near the base of each finger, between adjacent fingers, such that each void is effectively isolated by adjacent fingers of the sheet not merely by intervening hot-melt. This isolation by interposition of fingers of sheet is a better guarantee of isolation of any void space than mere interposition of hot-melt adhesive because hot-melt adhesives are designed to soften under heat; i.e., the application of pressure to softened hot-melt adhesive could cause the hot-melt to flow and thereby allow any voids to coalesce.

The cumulative transverse length of the interior edges, i.e., the total length of all transverse portions of all interior edges, will affect the degree of braking the movement of the exterior transverse edge from which the interior edges extend during recovery of the sheet, and the length of the fingers formed during recovery. In particular, the longer the cumulative transverse length of the interior edges, the more braking of the first exterior edge will occur and the longer the fingers formed during recovery. The cumulative transverse length of the interior edges is therefore not critical, so long as it is sufficient to provide the desired degree of braking the movement of the exterior transverse edge during recovery of the sheet and the desired length of the fingers formed during recovery. Accordingly, the cumulative transverse length of the interior edges should be sufficient to minimize the movement of the exterior transverse edge during the recovery of the sheet about a substrate and to form discrete fingers during recovery. In particular, the cumulative transverse length of the interior edges should be more than about 5% of the length of the exterior transverse edge from which they extend to provide a significant braking effect, preferably greater than about 25% and most preferably greater than about 50%.

When the sheet is to be used as a protective closure, it is wrapped about a substrate such that the exterior transverse edge from which the interior transverse edges extend is concealed within the closure.

FIG. 1 shows a sleeve 1 of this invention before recovery securely wrapped about a cylindrical substrate 2 having a layer 3 of hot-melt adhesive which will seal sleeve 1 to substrate 2. Diagonal slits 4 which are concealed by overlapping flap 5 of sleeve 1 are represented by broken lines while slits 4 exposed by midsection cut away 6 are represented by solid lines. When sleeve 1 is caused to recover and the hot-melt is softened by the application of heat thereto, interior edge 7 of the slit will buckle against the interior surface of overlapping flap 5 and thereby retard the movement of underlying edge 8 of sleeve 1 back toward 9 which secures sleeve 1 about the substrate 2 during the recovery of sleeve 1.

FIG. 2 shows the closure of FIG. 1 after sleeve 1 has been caused to recover about substrate 2. Slits 4 of the underlying edge 8 of FIG. 1 have formed fingers 11 between which voids 12 in layer 3 of hot melt adhesive have been isolated.

FIG. 3 shows a closure similar to that of FIG. 1, before recovery, wherein slits 13 are T-slits, rather than diagonal slits 4, as shown in FIG. 1.

FIG. 4 shows a closure similar to that of FIG. 1, before recovery, wherein interior edge 14 is the result of circular opening 17 from which extends slit 18 which extends to exterior transverse edge 19.

When wrapped and secured as shown in FIG. 1, the concealed first exterior edge 8 is the edge of a flap of material which extends from the line defined by second exterior edge 16 of the overlapping sheet to concealed edge 8. The precise length of this concealed flap in the recovery direction is not critical, but generally is about 25% of the length of the sheet in the direction of recovery. The interior edges should be confined to the concealed flap. Accordingly, the recovery length of substantially all of each of the interior edges of the sleeve should not exceed more than about 25% of the pre-recovery length of the sheet, i.e., the interior edges should not extend in a direction parallel to the direction of recovery from the first exterior edge more than about 25% of the pre-recovery length of the sheet, more preferably less than about 20% and most preferably less than about 15%.

Useful materials for the heat-recoverable sheet of this invention are typically comprised of a semicrystalline crosslinkable polymer, such as polyolefins (e.g., polyethylene), polyesters (e.g., polythylene terephthalate), or polyamides (e.g., nylon), which has been stabilized against ultraviolet and oxidative degradation. In the case of polyethylene and other polymers which are crosslinkable by radiation without significant degradation, electron beam crosslinking is highly desirable for web or tube processing and precision control of crosslinking chemistry. Radiation crosslinked materials generally contain a pro-rad (a multifunctional acrylate or allylic monomer) to enhance the dose/modulus response, and carbon black for increased reinforcement and thermal conductivity. Chemically crosslinked polymers, e.g., crosslinked by the use of silane, peroxide, etc. are also useful. Orientation of such materials typically follows the extrusion and crosslinking steps and must be performed at temperatures above the crystalline melt temperature of the composition. The orientation locks into place when the material is cooled in its stretched state. Generally recovery ratios of up to about 8 are possible to accommodate transitions in diameter with recovery forces ranging up to about 15 pounds per linear inch, which can be controlled by the extension ratio and the crosslink density.

As noted above, a hot-melt adhesive is used to seal the sheet material to the substrate after recovery of the sheet material. The hot-melt adhesive can be placed between the substrate and sheet material in any manner that will ensure an effective seal. In a preferred embodiment, one face of the heat-recoverable sheet material is preferably coated with a thin layer of a hot-melt adhesive which serves to seal the closure after the wrapping and heat-activated recovery thereof. Such hot-melt adhesives are known in the art, as exemplified by U.S. Pat. No. 4,018,733, the disclosure of which is incorporated herein by reference. a particularly preferred hot-melt adhesive is disclosed in U.S. application Ser. No. 753,016, filed by T. J. Bonk on July 8, 1985, the disclosure of which is incorporated herein by reference, wherein the hot-melt adhesive is disclosed to be a mixture of (a) an amine-terminated polyamide derived from dimer acid and (b) an acidic ethylene copolymer wherein the adhesive is adhesively crosslinked upon the application of heat to effect recovery of the sheet about a substrate.

The means of maintaining the security of the closure during recovery of the heat-recoverable sheet is not critical to this invention, and many suitable means are known in the art. A particularly preferred means is disclosed in U.S. application Ser. No. 752,946, filed by Bonk et al. on July 8, 1985, incorporated herein by reference, which describes the use of a crosslinked pressure-sensitive adhesive which can be applied to the heat-recoverable sheet to maintain the security of the closure during the recovery thereof.

The substrates which may be enclosed include pipes, conduits, cables and the like, and particularly those which in turn enclose means for telecommunication transmissions. These substrates typically have a surface composed of metal or synthetic polymers, e.g., lead or polyethylene. The closure is particularly useful in sealing a breach in the substrate to isolate the interior of the substrate from the surrounding environment.

EXAMPLES

Example 1

A sleeve was prepared from polyethylene heat-recoverable sheet having the characteristics shown below:
Backing characteristics:
Extruded Caliper = 0.100 inches
Stretched Caliper = 0.020 inches
Recovered Caliper = 0.090 inches
Shrink ratio = 4.5
Shrink force = 2.8 pli
M-200 = 24 psi
% gel = 95%

The sheet had a 20 mil layer of extruded hot melt on the reverse side. The sheet was trimmed to a rectangle of 12 inches in the "cable length" direction and 12.7 inches in the "circumferential" or "recovery" direction so as to form a sleeve. A series of diagonal slits were then cut in one of the 12 inch exterior transverse edges. The slits were cut at one inch intervals along the exterior edge at such an angle that the slits were each about 0.7 inch to 0.8 inch long, each extended about 0.3 inch toward the opposing exterior transverse edge and each extended about 0.68 inch along the exterior transverse edge. The slits of this Example and the following Examples were made by a simple incision of the sheet with a commercially available razor blade such that no sheet material was excised. Of course, material was excised from the sheet of Example 3, but only to the extent necessary to form the circular openings.

The sheet was then wrapped circumferentially around a 1.9 inch diameter cable with the first exterior edge enclosed 4 inches before securing the overlapping backing to the underlying backing surface thus creating a closed and overlapped sleeve of 2.7 inches in diameter. A MAPP (stabilized methylacetylenepropadiene available from Airco, Inc., Murray Hill, N.J.) gas torch with a bushy flame was used to shrink the sleeve down on to the cable. The geometry illustrated allowed the sleeves to recover about 25%, leaving a residual recovery force of about 2.24 pli which the closure strip used to secure the sleeve must hold. The closure strip used was prepared in accordance with the disclosure of U.S. application Ser. No. 752,946, filed July 8, 1985. The sleeves were heated for about 3-5 minutes to ensure activation of the hot melt. After the sleeve had completely cooled, it was opened by an incision opposite the concealed exterior edge along the length of the cable and the concealed exterior transverse edge was visually inspected. The edge had the appearance shown in FIG. 2 wherein the fingers 11 averaged 1.5 to 2 inches in length.

Example 2

Example 1 was repeated with the exception that the slits were T-slits as shown in FIG. 3 wherein each base of the T was separated from the base of an adjacent T-slit by 2 inches, each base was 0.3 inch in length and the transverse slit of each T was 1 inch length (i.e., 1 inch expanse of sleeve separated each adjacent transverse slit). The sheet was wrapped and caused to recover as in Example 1 with similar results with the exceptions that the fingers were block-ended and were from 0.8 to 1 inch in length.

Example 3

Example 1 was repeated with the exception that the interior edges resulted from circular openings and slits as shown in FIG. 4 wherein each slit 18 was 0.1 inch long and was 0.75 inch from each adjacent slit 18, and each circular opening 17 was 0.4 inch in diameter, i.e., a 0.35 inch expanse of sheet separated each circular opening 17 at their closest points. The sheet was wrapped and allowed to recover as in Example 1 with similar results with the exceptions that the fingers were block-ended and were 0.5 to 0.8 inch in length.

What is claimed is:

1. A heat-recoverable sheet having first and second opposing exterior transverse edges and a plurality of interior edges extending from said first exterior transverse edge, wherein said interior edges are defined by a plurality of slits extending from said first exterior transverse edge towards said second exterior transverse edge such that at least a portion of the length of each slit extends in a direction transverse to the direction of recovery of said sheet.

2. A heat-recoverable sheet in accordance with claim 1 wherein the cumulative transverse length of said interior edges is greater than about 5% of the length of said first exterior transverse edge.

3. A heat-recoverable sheet in accordance with claim 1 wherein the material of the sheet between each interior edge and said first exterior transverse edge has substantially the same recovery ratio, when allowed to recover without significant tension, as the remainder of the sheet.

4. A heat-recoverable sheet in accordance with claim 1 wherein the recovery length of substantially all of each of said interior edges is no more than 25% of the length of the sheet in the direction of recovery.

5. A heat-recoverable sheet in accordance with claim 1 wherein the width of each slit is less than the thickness of sheet.

6. A heat-recoverable sheet in accordance with claim 5 wherein the width of each of substantially all slits is no greater than a gap resulting from a simple incision into said sheet without excision of any of said sheet material.

7. A heat-recoverable sheet in accordance with claim 1 wherein the entire length of each of substantially all slits is transverse to the direction of recovery.

8. A heat-recoverable sheet in accordance with claim 1 wherein at least a portion of the length of each slit is a substantially straight line which forms an angle of between 15° and 45° with the exterior line of said first edge.

9. A heat-recoverable sheet in accordance with claim 1 wherein at least a portion of the length of said slits is parallel to the exterior line of said first edge.

10. A heat-recoverable sheet in accordance with claim 1 wherein a portion of each slit is perpendicular to said first and second opposing transverse edges.

11. A heat-recoverable sheet in accordance with claim 1 wherein said interior edges are defined by a plurality of openings through said sheet wherein a slit extends from each opening to said first exterior transverse edge.

12. A heat-recoverable sheet in accordance with claim 11 wherein the width of each opening in a direction perpendicular to the direction of recovery is greater than about 4 times the thickness of said sheet.

13. A heat-recoverable sheet in accordance with claim 1 further comprising a coating of a hot-melt adhesive on one major face of said sheet.

14. A heat-recoverable sheet in accordance with claim 13 wherein the hot-melt adhesive is comprised of a mixture of:
  (a) an amine-terminated polyamide derived from dimer acid and
  (b) an acidic ethylene copolymer wherein the adhesive is adhesively crosslinked upon the application of heat to effect recovery of the sheet about a substrate.

15. A method of enclosing a substrate comprised of wrapping a heat-recoverable sheet in accordance with claim 1 about a substrate in a manner such that
  (a) said first edge of said sheet is enveloped between said substrate and said sheet, and
  (b) a hot-melt adhesive is present between said substrate and said sheet and is effective in sealing the closure after recovery of the sheet.

16. A method in accordance with claim 15 wherein said sheet has a coating of a hot-melt adhesive on one major face thereof and the sheet is wrapped in such a manner that at least a portion of the sheet enveloped within the closure is in contact with said coating of hot-melt adhesive.

17. An enclosed substrate prepared by the method of claim 15.

18. A method of preparing a heat-recoverable sheet having first and second opposing exterior transverse edges for use as a wrap-around protective closure, wherein said method comprises forming a plurality of interior edges in said sheet, said interior edges being defined by a plurality of slits extending from said first exterior transverse edge towards said second exterior transverse edge such that at least a portion of the length of each of said interior edges is transverse to the direction of recovery of said sheet.

* * * * *